United States Patent
Foltin

(10) Patent No.: US 9,937,888 B2
(45) Date of Patent: Apr. 10, 2018

(54) METHOD AND DEVICE FOR CONTROLLING TRIGGERING OF AT LEAST ONE PASSENGER PROTECTION DEVICE FOR A MOTOR VEHICLE AND SAFETY SYSTEM FOR A VEHICLE

(71) Applicant: Robert Bosch GmbH, Stuttgart (DE)

(72) Inventor: Johannes Ludwig Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/182,322

(22) Filed: Jun. 14, 2016

(65) Prior Publication Data
US 2016/0368445 A1 Dec. 22, 2016

(30) Foreign Application Priority Data
Jun. 17, 2015 (DE) .................. 10 2015 211 129

(51) Int. Cl.
| | |
|---|---|
| *B60R 21/01* | (2006.01) |
| *G01S 17/93* | (2006.01) |
| *B60R 21/0134* | (2006.01) |
| *G01S 13/93* | (2006.01) |
| *B60R 21/013* | (2006.01) |
| *B60N 2/42* | (2006.01) |

(Continued)

(52) U.S. Cl.
CPC ........ *B60R 21/0134* (2013.01); *G01S 13/931* (2013.01); *G01S 17/936* (2013.01); *B60N 2/42* (2013.01); *B60R 2021/01304* (2013.01); *B60R 2021/01308* (2013.01); *G01S 13/862* (2013.01); *G01S 13/865* (2013.01); *G01S 13/867* (2013.01); *G01S 17/023* (2013.01); *G01S 2013/9353* (2013.01); *G01S 2013/9364* (2013.01); *G01S 2013/9367* (2013.01)

(58) Field of Classification Search
CPC . B60R 21/0134; G01S 13/931; G01S 17/936; G01S 17/023; G01S 13/862; G01S 13/867; G01S 2013/9353; G01S 2013/9364; G01S 2013/9367; G01S 13/865
See application file for complete search history.

(56) References Cited

U.S. PATENT DOCUMENTS

2007/0296564 A1* 12/2007 Howell .................. B60Q 1/525
340/435
2009/0326766 A1* 12/2009 Wang .................. B60R 21/0134
701/46

(Continued)

FOREIGN PATENT DOCUMENTS

EP 1 807 715 7/2007

*Primary Examiner* — Rodney A Butler
(74) *Attorney, Agent, or Firm* — Norton Rose Fulbright US LLP; Gerard Messina

(57) ABSTRACT

A method for controlling triggering of at least one passenger protection device for a vehicle. The method includes a step of determining whether a signal level of at least one read-in impact signal, which represents a change in a vehicle condition indicating a potential collision of the vehicle with a potential accident object, exceeds an evaluation limiting value. The method also includes a step of using a high triggering threshold value for triggering of the at least one passenger protection device when the signal level of the at least one read-in impact signal exceeds the evaluation limiting value.

11 Claims, 2 Drawing Sheets

(51) Int. Cl.
G01S 13/86 (2006.01)
G01S 17/02 (2006.01)

(56) References Cited

U.S. PATENT DOCUMENTS

| | | | |
|---|---|---|---|
| 2011/0181407 A1* | 7/2011 | Kole | G01O 5/00 340/435 |
| 2013/0099908 A1* | 4/2013 | Salomonsson | B60R 21/0134 340/425.5 |
| 2014/0145838 A1* | 5/2014 | Tuukkanen | B60Q 1/085 340/436 |
| 2015/0165937 A1* | 6/2015 | Harda | B60N 2/4221 701/45 |
| 2015/0342542 A1* | 12/2015 | An | A61B 5/747 455/404.2 |

* cited by examiner

METHOD AND DEVICE FOR CONTROLLING TRIGGERING OF AT LEAST ONE PASSENGER PROTECTION DEVICE FOR A MOTOR VEHICLE AND SAFETY SYSTEM FOR A VEHICLE

CROSS REFERENCE

The present application claims the benefit under 35 U.S.C. § 119 of German Patent Application No. DE 102015211129.6 filed on Jun. 17, 2015, which is expressly incorporated herein by reference in its entirety.

FIELD

The present invention is directed to a device, method, and computer program for controlling triggering of a passenger protection device for a motor vehicle.

BACKGROUND INFORMATION

For the safety of occupants, motor vehicles often have safety systems. Such a system may include, for example, a radar sensor and a video sensor. For example, an impending accident, the time of an accident, an intensity, from magnitude and relative velocity, for example, and a direction may be determined in particular via a combination of sensor data in order to trigger restraint systems such as an airbag, for example.

European Patent No. EP 1 807 715 A1 describes a sensor system, including a radar sensor and a vision sensor.

SUMMARY

According to specific embodiments of the present invention, a desensitization of predictive accident prevention systems and occupant safety systems may be implemented in particular to prevent accidental triggering. Passive restraint systems, which may use surroundings sensors to carry out an early or earlier triggering of actuators, may utilize surroundings sensors, for example, to predict the time window of an accident and to react within this time window more sensitively to so-called crash signals or impact signals in particular. When impact signals or vibration signals occur before the time window in particular, the time window may be left unopened for a sensitive response or it may be closed. For example, if the impact signals, for example, acceleration signals, are above a limiting value for a certain period of time before the time of a possible accident, then the sensitivity may remain at a high level or be increased to avoid accidental triggering of passenger protection devices.

According to specific embodiments of the present invention, in particular the safety, accuracy and reliability of equipment for occupant protection in vehicles may be increased advantageously. More specifically, accidental triggering of passenger protection devices in particular may be prevented, which, for example, may be attributed to poor road conditions or the like. Therefore, a situation-related precision of a triggering operation of a passenger protection device may be improved. It may be achieved that a passenger protection device may be triggered reliably when it is essential and erroneous triggering without an accident being present may be reliably prevented.

A method for controlling triggering of at least one passenger protection device for a vehicle is presented, the method including the following steps:

determining whether a signal level of at least one read-in impact signal represents a change in a vehicle condition indicating a potential collision of a vehicle with a potential accident object, exceeds an evaluation limiting value; and using a high triggering threshold value for triggering of the at least one passenger protection device when the signal level of the at least one read-in impact signal exceeds the evaluation limiting value.

This method may be implemented, for example, in software or hardware or in a hybrid form of software and hardware, for example, in a control unit or a device. The vehicle may be designed as a motor vehicle, for example, a road vehicle, in particular a passenger vehicle, a motorcycle, a truck, a commercial vehicle or the like. The at least one passenger protection device may be an airbag, a seatbelt tightener, at least one additional restraint device and, additionally or alternatively, other equipment. The impact signal may be read in by a vehicle sensor. The change in a vehicle condition may be a position change, a velocity change, a pressure change and, additionally or alternatively, a change in some other physical condition of the vehicle or with regard to the vehicle. The evaluation limiting value may be predefined or variably adjustable. The high triggering threshold value may be greater than another triggering threshold value, which is different from the high triggering threshold value, such as a low triggering threshold value, for example, which may be usable or used in the use step. If the high triggering threshold value is used, a higher signal level of the impact signal may be necessary for triggering the at least one passenger protection device than when using the additional triggering threshold value, which is different from the high triggering threshold value.

According to one specific embodiment, in the determination step, it is possible to determine whether the signal level of the at least one read-in impact signal exceeds the evaluation limiting value before a minimum period is reached prior to the potential collision and, additionally or alternatively, before a potential accident object has been detected, in particular when the potential accident object is detected at a maximum distance from the vehicle. The minimum period may be defined by an initial point in time of a time window, which includes a point in time of the potential collision. Such a specific embodiment offers the advantage that the safety and reliability of a correct triggering operation and correct prevention of a triggering operation of passenger protection devices may be increased. By also taking into account the maximum distance of the potential accident object from the vehicle, it is possible to ensure that there is no inadvertent triggering of the passenger protection device, even in the event of rough road conditions.

In the use step, a low triggering threshold value may also be used for triggering the at least one passenger protection device if the signal level of the at least one read-in impact signal falls below the evaluation limiting value. Such a specific embodiment offers the advantage that in particular when there is a recognized accident object, a sensitivity for a triggering operation is or may be reduced when interference factors such as rough road conditions may be ruled out in the triggering operation.

In the use step, the low triggering threshold value may be used within a time window, which may include an ascertained point in time of the potential collision of the vehicle with an accident object. The time window may be predefined or may be variably settable. The high triggering threshold value may be used outside of the time window in the use step. Such a specific embodiment offers the advantage that an increased sensitivity with regard to a triggering operation may also be limited in time to increase the safety and accuracy of triggering with regard to interference factors.

Furthermore, in the use step, the high triggering threshold value may be used when the signal level of the at least one read-in impact signal exceeds the evaluation limiting value for a minimum period. The minimum period may be predefined or may be variably settable. Such a specific embodiment offers the advantage that the accuracy of detection of possible interference factors to a triggering operation may be further increased.

Alternatively, exceeding the evaluation limiting value for a minimum period may be understood to mean that the evaluation limiting value is exceeded at least once or twice or several times within the minimum period. This may be used advantageously when the impact signal has high-frequency signal components.

According to one specific embodiment, the method may include a step of reading in surroundings data with regard to the surroundings of the vehicle. In the use step, the high triggering threshold value or a triggering threshold value, which is different from the high triggering threshold value, may be used, depending on the read-in surroundings data. The triggering threshold value, which is different from the high triggering threshold value, may be the low triggering threshold value or some other triggering threshold value. The surroundings data may be map-based surroundings data and, additionally or alternatively, sensor-based surroundings data. Such a specific embodiment offers the advantage that it is possible to recognize even more reliably and with greater accuracy which sensitivity setting should be used for a triggering operation based on the specific situation.

In the step of reading in, the surroundings data may be read in by an interface to a device for providing map-based surroundings data representing a triggering threshold value which is recommended for the surroundings of the vehicle, a road condition, the surface of the road and, additionally or alternatively, at least one other road characteristic in the surroundings of the vehicle. Additionally or alternatively, in the step of reading in, the surroundings data may be read in by an interface to at least one detection device for providing sensor-based surroundings data representing a road condition, a road surface and, additionally or alternatively, at least one additional road characteristic in the surroundings of the vehicle. The surroundings data may thus be map data and may additionally or alternatively be sensor data. The at least one detection device may be a vehicle camera, a pitch rate sensor, a headlight height level sensor for automobiles and, additionally or alternatively, an additional vehicle sensor, and additionally or alternatively, surroundings sensors. Such a specific embodiment offers the advantage that a piece of information about a condition or a characteristic of a road on which the vehicle is moving is obtainable easily, reliably and, additionally or alternatively, independently of map data.

In the step of reading in, the surroundings data may also be read in by an interface to at least one detection device for providing sensor-based surroundings data representing a potential accident object to ascertain the potential collision. The at least one detection device may be a vehicle camera, a radar sensor, a LIDAR sensor, an infrared sensor and, additionally or alternatively, an additional vehicle-mounted surroundings sensor, in particular. Such a specific embodiment offers the advantage that the presence of a potential accident object may be reliably and safely detected. Furthermore, the point in time of impact and, additionally or alternatively, a time window around the point in time of impact may be ascertained by using such surroundings data.

The approach presented here also creates a device which is designed to carry out, activate or implement the steps of one variant of the method presented here in corresponding units. Through this embodiment variant of the present invention in the form of a device, the object on which the present invention is based may also be achieved quickly and efficiently.

In the present case, a device may be understood to be an electrical device, which processes sensor signals and outputs control signals and/or data signals as a function thereof. The device may have an interface, which may be designed in hardware and/or software. In a hardware design, the interfaces may be part of a so-called system ASIC, which includes a wide variety of functions of the device. However, it is also possible for the interfaces to be separate integrated circuits or to at least partially include discrete elements. In a software design, the interfaces may be software modules, which are present on a microcontroller, for example, in addition to other software modules.

A safety system for a vehicle is also presented, the safety system having the following features:

at least one passenger protection device; and a specific embodiment of the device described above, the device being designed to control the triggering of the at least one passenger protection device.

Thus, in combination with the safety system, one specific embodiment of the aforementioned device or control device may advantageously be used to trigger the at least one passenger protection device. The at least one passenger protection device and the device may be linked together in a manner capable of signal transmission. Furthermore, the safety system may include at least one vehicle sensor, at least one surroundings sensor and, additionally or alternatively, at least one data transmission interface.

Also advantageous is a computer program or a computer program product having program code, which may be stored on a machine-readable carrier or memory medium, such as a semiconductor memory, a hard drive memory or an optical memory and is used to carry out, implement and/or activate the steps of the method according to one of the specific embodiments described above, in particular when the program product or program is carried out on a computer or a device.

Exemplary embodiments of the present invention are illustrated in the figures and described in greater detail below.

DETAILED DESCRIPTION OF EXAMPLE EMBODIMENTS

Figure 1:
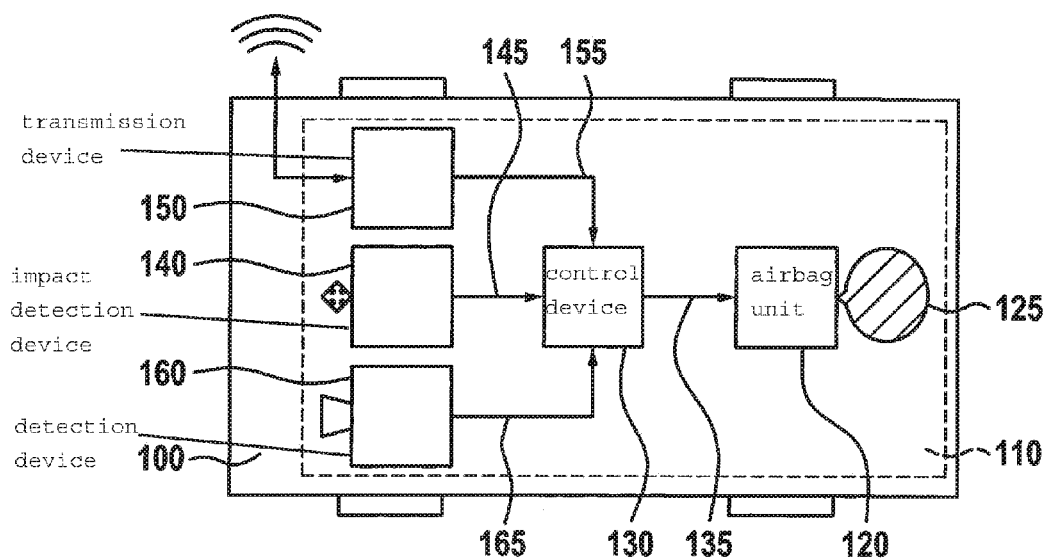
FIG. 1 shows a schematic representation of a vehicle, including a safety system according to one exemplary embodiment.

In the following description of favorable exemplary embodiments of the present invention, the same or similar reference numerals are used for the elements illustrated in the various figures and those having a similar action, so that a repeated description of these elements will be dispensed with.

Backgrounds and principles for exemplary embodiments of the present invention will initially be explained in general terms below.

With regard to passive safety systems in motor vehicles, it may be stated in general that both reversible and nonreversible restraint systems are to protect a driver or occupants in an accident from serious or even fatal consequences. For accident severity mitigation for the driver, there are various systems, which may be divided into sensors and actuators.

Passive safety actuators include, for example, active seats, embodiments of airbags, for example, a driver airbag out of the steering wheel, a knee bag for protecting the knees in a forward displacement and against so-called submarining or slipping under the belt, so-called curtain bags to protect the head in a side impact and to prevent objects from the outside from being able to penetrate into the passenger compartment and the like. Active seats may change their shape in an accident and thus prevent submarining, for example, or bring the driver or occupants into a safer position, for example, moving toward the rear, so that the driver gains more space from the steering wheel and maximum accelerations may be reduced. Seatbelt tighteners may reduce the looseness of seatbelts and couple the driver or occupants to the vehicle. Forward displacement of the driver or occupants may be reduced in this way or the driver or occupant may be decelerated more uniformly together with the vehicle. Accidents with pedestrians may be mitigated, for example, if an engine hood is raised and/or additional outside airbags are deployed for pedestrians (so-called window bags) to reduce the impact severity of a pedestrian with the engine block by raising the engine hood or reducing the A pillars of the vehicle with the aid of airbags. The passive safety actuators may also be summarized under the term restraint system.

Passive safety sensors are used for ascertaining an accident in particular and the type of accident, if necessary. The main sensor may be an acceleration sensor, which may be installed in a protected manner at the center of the vehicle, for example. This may be sufficient for simple detection of an accident, but a multi-sensor system is even more robust. Pedestrian accidents, for example, may be detected, in such a way that additional acceleration sensors are mounted in the front area of an engine hood to measure as soon as possible weak acceleration values caused by a pedestrian on the vehicle and to promptly detect an accident. Additionally or alternatively, a pressure tube sensor may be used, including a silicone tube having two pressure sensors at the ends, for example. The tube may be installed behind the bumper. When the bumper is depressed by a pedestrian's leg, the pressure in the tube rises and a pressure wave is generated in the tube. The sensors detect an increase in pressure and are able to ascertain the position of impact of the pedestrian with the vehicle from a pressure wave transit time difference. Acceleration sensors in various locations in the vehicle permit a plausibility check of the pressure sensor signal. Pressure sensors in the vehicle doors are able to detect a side impact with the doors since the air pressure in the interior of the door rises briefly in a collision. Pressure sensors are also able to react quickly. For example, it is possible to cover a large surface using relatively few sensors, for example, two pressure sensors, with the aid of a pressure tube on the front of the vehicle.

Integrated safety systems in particular or active safety systems, for example, stability control, ESP or brake activation and comfort systems, for example, a lane keeping assistant, are also being linked with passive safety systems in vehicles to an increasing extent. Systems both with and without surroundings sensor systems are thus available.

An accident may be preceded by sharp braking or skidding of the vehicle. ABS and ESP systems may be active in such cases. If the safety system detects an ABS/ESP intervention, reversible actuators may be triggered to bring occupants into a position in which they will be better able to survive a potentially impending accident. The passenger's seat may be moved to an optimal position, seatbelt tighteners may be activated to remove looseness in a belt and windows on the side or the roof may be closed. In some cases, these systems may be supported by surroundings sensor systems. After an accident, there may be follow-up collisions since the driver cannot keep the vehicle stable, for example, after the first collision, for example, if the driver is unconscious due to the initial collision. So-called secondary collision mitigation systems are able to decelerate the vehicle in a targeted manner to reduce the risk of an additional collision, for example, with oncoming traffic. In another expansion stage, the vehicle may be kept in a lane when braking to prevent skidding into oncoming traffic.

A safety device, for example, an airbag triggering algorithm or an airbag triggering control unit may also be adjusted on the basis of surroundings sensors. For example, surroundings sensors may detect the surroundings by mono/stereo camera, radar, LIDAR and/or ultrasound and ascertain a possible impending accident and the type of accident. An airbag control unit may be adjusted with greater sensitivity under defined prerequisites, so that triggering of the restraint systems may take place more rapidly. Thus, for example, when using a radar sensor, an impending front collision with another vehicle may be ascertained. During a time window around the point in time ascertained, at which the accident will presumably take place, an activation threshold for restraint systems may be lowered, so that an earlier and more sensitive reaction is achievable, for example. If a possible accident is recorded by passive safety sensors, it is possible to react to it more rapidly since the duration of the plausibility check may be limited. Depending on the expansion stage, a front collision or side collision may be predicted or it is possible to respond to a rear collision. In collisions, a distinction may be made between different parties to the accident, for example, vehicle, truck, pedestrian or a stationary object. Such a safety system may also be used under the condition that an accident has already taken place. A response time may be shortened so that vehicle occupants may be better prepared for an accident, for example, by creating more space to reduce the kinetic energy and thereby prevent acceleration peaks. A basic functionality of accident sensing using acceleration sensors, etc., for example, is retained.

FIG. 1 shows a schematic representation of a vehicle 100 including a safety system 110 according to one exemplary embodiment. Vehicle 100 is a motor vehicle, for example, in the form of a passenger vehicle or the like. Vehicle 100 includes safety system 110. Safety system 110 is situated in or on vehicle 100.

Safety system 110 has at least one passenger protection device 120, according to the exemplary embodiment represented in FIG. 1, only one passenger protection device 120 being shown as an example. Passenger protection device 120 is designed as an airbag unit 120, which has an inflatable airbag 125, represented symbolically in an inflated condition in FIG. 1.

Furthermore, safety system 110 has a device 130 for controlling, i.e., a control device 130. Control device 130 and passenger protection device 120 are interconnected with data transmission and signal transmission capabilities. Control device 130 is designed to control triggering, i.e., a triggering operation for passenger protection device 120.

Control device 130 is therefore designed to output a control signal 135 to passenger protection device 120 or to an interface to passenger protection device 120. Control signal 135 is suitable for effectuating and/or controlling triggering, i.e., the triggering operation for passenger protection device 120.

Safety system 110 also has at least one impact detection device 140, the representation in FIG. 1 showing only one impact detection device 140 as an example. Impact detection device 140 is designed to detect a potential collision of vehicle 100 with a potential accident object. Impact detection device 140 is designed in particular to detect a change in a vehicle condition indicating a potential collision of vehicle 100 with a potential accident object.

Impact detection device 140 is designed as an acceleration sensor, for example. Acceleration of vehicle 100 here is detectable as a physical change in a vehicle condition. Impact detection device 140 is designed to provide an impact signal 145, which represents the detected change in vehicle condition indicating a potential collision of vehicle 100 with a potential accident object.

Impact detection device 140 and control device 130 are interconnected with signal transmission capability. Control device 130 is designed to receive or read in impact signal 145 from impact detection device 140. Control device 130 is therefore designed to generate control signal 135 using impact signal 145. Control device 130 is discussed further below, in particular with reference to FIG. 2.

According to the exemplary embodiment represented in FIG. 1, safety system 110 also includes a transmission device 150 or provision device 150 for providing map-based surroundings data 155 with regard to the surroundings of vehicle 100. Transmission device 150 is designed, for example, to retrieve and/or receive map-based surroundings data 155 via radio, for example, from a memory device outside of vehicle 100. Transmission device 150 and control device 130 are interconnected with signal transmission capability. Map-based surroundings data 155 represent a triggering threshold value, which is recommended for the surroundings of vehicle 100 for triggering, i.e., the triggering operation of passenger protection device 120, a road condition, a road surface and/or at least one other road characteristic in the surroundings of vehicle 100. Control device 130 is designed to receive or read in map-based surroundings data 155 from transmission device 150. Control device 130 is thus designed to generate control signal 135 using map-based surroundings data 155.

Safety system 110 according to the exemplary embodiment shown in FIG. 1 also includes, for example, only one detection device 160 for providing sensor-based surroundings data 165 with regard to the surroundings of vehicle 100. Detection device 160 is designed, for example, as a vehicle camera for recording image data of the surroundings of vehicle 100. Detection device 160 and control device 130 are interconnected with signal transmission capability. Sensor-based surroundings data 165 represent a potential accident object, a road condition, a road surface and/or at least one additional road characteristic in the surroundings of vehicle 100. Control device 130 is designed to receive or read in sensor-based surroundings data 165 from detection device 160. Control device 130 is thus designed to generate control signal 135 using sensor-based surroundings data 165.

Figure 2:
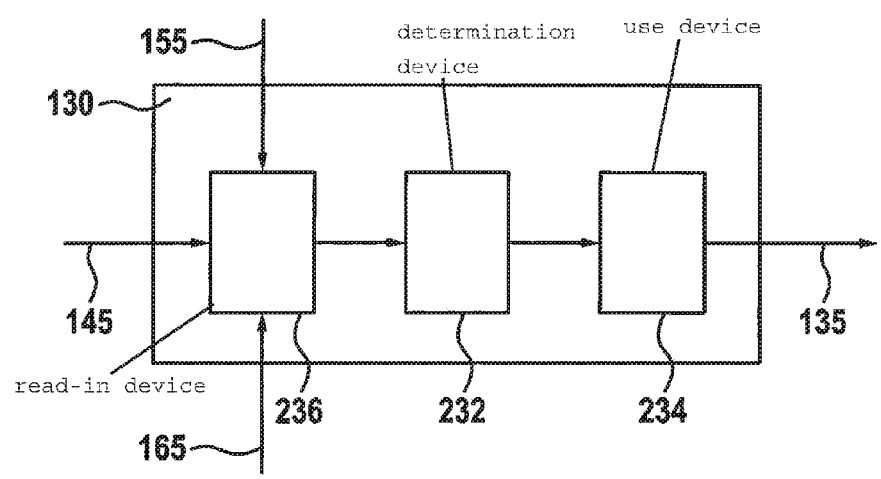
FIG. 2 shows a schematic representation of a control device according to one exemplary embodiment.

FIG. 2 shows a schematic representation of a control device 130 according to one exemplary embodiment. Control device 130 is the control device from FIG. 1 or a similar control device. Control device 130 is thus a device 130 for controlling the triggering of at least one passenger protection device for a vehicle, for example, the vehicle from FIG. 1.

Control device 130 is designed to generate control signal 135 using impact signal 145. Control device 130 is designed here to receive impact signal 145. Furthermore, control device 130 is designed to output or provide control signal 135.

Control device 130 has a determination device 232, i.e., a device 232 for determining, and a use device 234, i.e., a device 234 for use. Determination device 232 and use device 234 are interconnected with data transmission capability.

Determination device 232 is designed to determine whether a signal level of at least one read-in impact signal 145 exceeds or falls below an evaluation limiting value. An impact signal 145 here represents a change in a vehicle condition, for example, an acceleration, which indicates a potential collision of the vehicle with a potential accident object. Determination device 232 is designed to output result data from the determination to use device 234 or to provide the data for same.

Use device 234 is designed to use a high triggering threshold value for triggering the at least one passenger protection device when the signal level of the at least one input impact signal exceeds the evaluation limiting value.

Furthermore, use device 234 is designed to use a low triggering threshold value for triggering the at least one passenger protection device when the signal level of the at least one input impact signal falls below the evaluation limiting value.

According to the exemplary embodiment shown in FIG. 2, use device 234 is designed to generate control signal 135, control signal 135 being generated by use of or as a function of the high triggering threshold value or the low triggering threshold value.

According to the exemplary embodiment represented in FIG. 2, control device 130 also has a read-in device 236. Read-in device 236 is designed to read in map-based surroundings data 155 and/or sensor-based surroundings data 165 with regard to the surroundings of the vehicle. Read-in device 236 is also designed to read in impact signal 145. Read-in device 236 is also designed to provide impact signal 145, map-based surroundings data 155 and/or sensor-based surroundings data 165 of determination device 232 directly or indirectly to use device 234. Use device 234 is thus designed, for example, to use the high triggering threshold value or a triggering threshold value different from the high triggering threshold value, in particular the low triggering threshold value, as a function of read-in surroundings data 155 and/or 165.

Read-in device 236 may be designed to read in map-based surroundings data 155 from an interface to the transmission device. Additionally or alternatively, read-in device 236 may be designed to read in sensor-based surroundings data 165 from an interface to the at least one detection device.

According to one exemplary embodiment, control device 130 may also have an ascertainment device, which is designed to ascertain a potential collision of the vehicle with the potential accident object from sensor-based surroundings data 165 representing a potential accident object.

Figure 3:
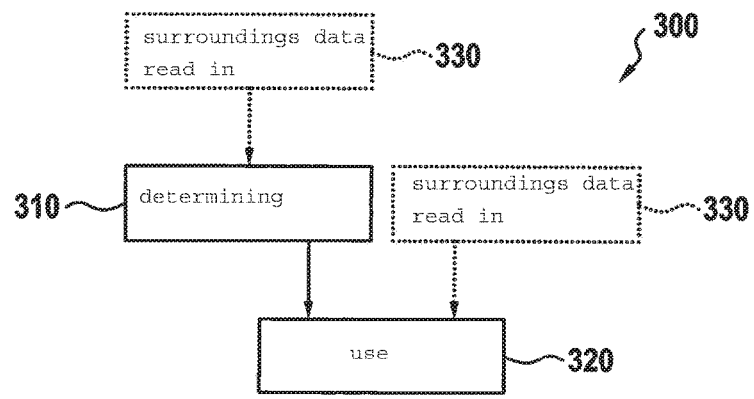
FIG. 3 shows a flow chart of a method for control according to one exemplary embodiment.

FIG. 3 shows a flow chart of a method 300 for control according to an exemplary embodiment. Method 300 is implementable to control a triggering operation of at least one passenger protection device for a vehicle. Method 300 may be carried out in combination with or by using a safety system, such as the safety system from FIG. 1 and/or in combination with or using a control device, such as the control device from FIG. 1 and FIG. 2.

Method 300 has a step 310 of determining and a step 320 of use, which may be carried out subsequently. In step 310 of determining, it is determined whether or not a signal level of at least one read-in impact signal, representing a change in a vehicle condition indicating a potential collision of the vehicle with a potential accident object, exceeds an evaluation limiting value. In step 320 of use, a high triggering threshold value for triggering of the at least one personal protection device is used when the signal level of the at least one read-in impact signal exceeds the evaluation limiting value. Otherwise in step 320 of use, a low triggering threshold value is used for triggering of the at least one passenger protection device when the signal level of the at least one read-in impact signal falls below the evaluation limiting value.

In particular, in step 310 of determining, it is possible to determine whether the signal level of the at least one read-in impact signal exceeds the evaluation limiting value prior to a minimum period before the potential collision is reached and/or before a potential accident object has been detected. According to one exemplary embodiment, in step 320 of use, the low triggering threshold value is used within a time window, which includes an ascertained point in time of the potential collision of the vehicle with an accident object. Furthermore, the high triggering threshold value may optionally be used in step 320 of use if the signal level of the at least one read-in impact signal exceeds the evaluation limiting value for a minimum period and/or exceeds the evaluation limiting value repeatedly within a minimum period. In particular in the case of high-frequency signals which have been freed of any offset, the measured value generally does not remain statically at a specific value. Instead of the evaluation of the measured value over a period of time, the impact may then be detected by measuring this step of repeatedly exceeding the evaluation limiting value within a time.

According to one exemplary embodiment, method 300 includes a step 330 of reading in surroundings data with regard to the surroundings of the vehicle. In step 320 of use, depending on the surroundings data read in in step 330 of reading in, the high triggering threshold value or a triggering threshold value different from the high triggering threshold value, in particular the low triggering threshold value, may be used. Step 330 of reading in may be carried out before, during and/or after step 310 of determining. Optionally in step 330 of reading in, at least one impact signal may also be read in.

Figure 4:
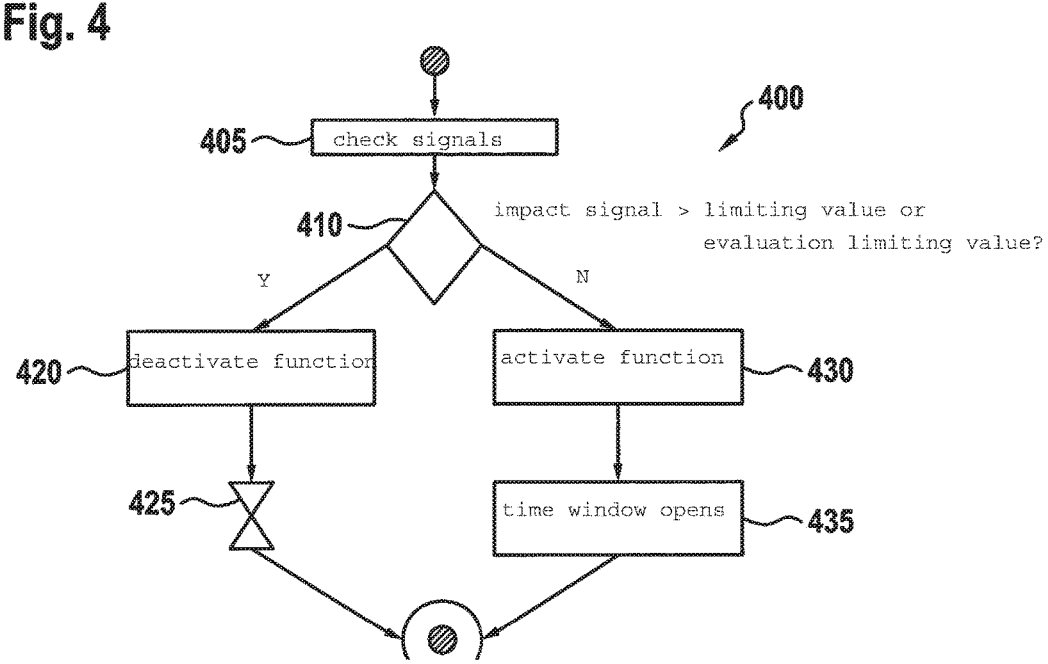
FIG. 4 shows a flow chart of a control process according to one exemplary embodiment.

FIG. 4 shows a flow chart of a control process 400 according to one exemplary embodiment. Control process 400 may be carried out in conjunction with the method from FIG. 3. Therefore, control process 400 may also be carried out using a safety system such as the safety system from FIG. 1 and/or in conjunction with the use of a safety system such as the safety system from FIG. 1 and FIG. 2. Control process 400 represents a sequence for controlling a triggering operation of at least one passenger protection device.

After the start of control process 400, a check is carried out in a block 405 to ascertain whether signal levels of impact signals are high, although no impact-relevant object or potential accident object has been detected. Impact signals are thus analyzed in block 405. In a downstream decision block 410, it is determined whether at least one signal level of an impact signal is above a limiting value or an evaluation limiting value.

If a determination in decision block 410 reveals that at least one signal level of an impact signal is above the evaluation limiting value, then in a block 420 a function is deactivated in which a triggering threshold value for triggering of the at least one passenger protection device may be lowered. In other words, in block 420 a high triggering threshold value for triggering the at least one passenger protection device is used or set or retained. If the values or signal levels of the impact signals are high and if it is to be prevented that emergence of a potential accident object might result in a direct or unfounded activation of restraint systems, then such a threshold value reduction function in a block 425 is deactivated for a definable period of time. If the signal levels in the definable period of time drop back to a normal level, the function may be reactivated, for example, after the end of a run of control process 400, for example, by renewed processing of the sequence of control process 400.

If the determination in decision block 410 reveals that at least one signal level of one impact signal is below the evaluation limiting value, then in a block 430, the function at which a triggering threshold value for triggering of the at least one passenger protection device may be lowered is activated. In other words, a low triggering threshold value for triggering of the at least one passenger protection device is used or set in block 430. In a following block 435, there is a reaction to possible accident objects where a time window is opened, for example, in which there is a more sensitive response to potential accident objects or there is a response using the low triggering threshold value. Thereafter, a run of control process 400 is terminated.

With reference to FIGS. 1 through 4, exemplary embodiments and relevant aspects of exemplary embodiments are explained again below in summary and using other words.

According to the exemplary embodiments, impact signals 145 and surroundings data 155 and 165 may be analyzed more reliably, and a plausibility check may be performed more easily on data from different sensors to implement a more robust and reliable triggering of passenger protection devices 120.

Thus, for example, inadequacies of various sensors may also be bypassed. Radar sensors detect different objects on the basis of echoes from electromagnetic waves emitted previously. A reflection on edged metallic objects such as vehicles may be intense, for example, which may result in a good detection performance with respect to vehicles. Metallic objects, if they are designed, for example, like a triple mirror or a retroreflector, may result in misdetections by radar sensors. For example, a cola can, a drain cover, a guiderail or a bridge pillar may result in misdetections by radar sensors. Camera systems and LIDAR systems are optical systems which evaluate reflections from active illumination, as in the case of LIDAR, or from ambient light, as in the case of a camera. Under some circumstances, it may be difficult to differentiate nonsolid particles or clouds of loosely cohesive particles from solid objects. Thus, for example, steam on drain covers, smoke, leaves or drifting snow may be falsely recognized as a potential accident object. A misdetection is preventable in particular by carrying out a plausibility check and/or by a combination of sensor data in safety system 110.

Detection devices 160 or surroundings sensors 160 are designed, for example, to recognize a potential accident situation, for example, with the aid of video and/or radar. Safety system 110 may be designed, for example, to estimate a potential point in time of impact and, around the expected time of impact, to open a time window or a so-called crash window, in which there is a more sensitive response to impact signals 145. A size or length of the time window may depend on various factors, such as the inaccuracy of sensor signals and their scanning points in time or scanning frequency. The time window is set to be larger when the sensor signals or information is less accurate. For example, a time window is selected to be as small as possible to prevent triggering of restraint systems simply due to strong vibrations. By using the high triggering threshold value, an airbag triggering algorithm has a robust design to prevent misfirings due to vibrations. Normally an accident is detected and airbag 125 triggered, for example, only after a certain duration and intensity of vibrations, which is recognizable on the basis of the signal level of impact signal 145. Using the high triggering threshold value, an airbag triggering algorithm is designed not to trigger passenger protection device 120 or restraint means or to trigger it with a reduced sensitivity, for example, in the case of a rough road with high vibrations. Surroundings data 155 and/or 165 or signals from the surroundings sensor system may also be used to adjust the robustness of the airbag algorithm. For example, it is possible to prevent a reaction to metallic parts on a road. For example, when vehicle 100 is traveling on a rough road and experiences high vibrations, it is thus possible to prevent deployment of airbag 125 because of a single object which is wrongly classified as critical, for example, a metallic foil blowing around in the wind.

According to exemplary embodiments, the passenger protection device 120 may be controlled, for example, in such a way that airbag 120 is triggered not only due to strong accelerations. In a similar case, a so-called window watchdog inside a certain time window may be newly pulled up to prevent a reset of the system and to achieve an error safeguard. If the watchdog is accessed outside of the time window, this is also considered to be an error and the system may be restarted. In particular at least one detection device 160 or surroundings sensors may be used to calculate from their information a time window in which the triggering threshold value or an activation threshold is reduced. In other words, for example, if moderately strong signal levels of impact signals 145 or acceleration signals occur within the time window, then airbag 125 may be triggered by confirmation of the surroundings sensor when the low triggering threshold value is used. But now, if vehicle 100 is driving over a rough road, for example, with gravel, etc., then such moderately strong accelerations may occur as a standard. By using the high triggering threshold value, it is possible to prevent airbag 155 from being triggered, for example, because of surroundings sensor information or merely because of surroundings sensor data 165 on a poorly developed road, where a beverage can in the gravel, for example, may also throw a reflection or vertical metal structures, drifting snow or dust or the like which may be present.

According to exemplary embodiments, impact signals 145 over a definable period of time may be considered in order to use the high triggering threshold value or to deactivate a triggering threshold-reducing function if restraint systems such as passenger protection device 120 would be triggered by a confirmation by detection device 160 or the surroundings sensor. If a possible triggering is active for a definable period of time without resulting in a confirmation by detection device 160 or the surroundings sensor, then the triggering threshold-reducing function may be deactivated. It may then be assumed that vehicle 100 is traveling on a poor roadbed and that the triggering threshold value or the activation threshold should not be reduced greatly.

Alternatively, other detection devices or different sensors may be used to measure a road quality, for example, such as a pitch rate sensor, a vehicle camera, a headlight height level sensor of vehicle 100 and/or the like. According to exemplary embodiments, the triggering threshold value may be adapted as a function of the road quality ascertained in this way.

In particular, the triggering threshold-reducing function is deactivated when signal levels of impact signals 145 are higher before a time window of a potential collision than a definable or adjustable evaluation limiting value. Control device 130 is designed to consider, evaluate or analyze impact signals 145 in order to retain or adjust a sensitivity to a high level by using the high triggering threshold value when the signal levels of impact signals 145 are above the evaluation limiting value for a certain period of time. It is possible in this way to prevent a confirmation of a possible accident object by a surroundings sensor, for example, detection device 160, to result in an accidental triggering of passenger protection device 120. For example, in principle a surroundings sensor is to detect a potential accident object before an accident takes place. If impact signals 145, which are typical of a start of an accident, occur when no potential accident object has been detected, then such impact signals 145 may be due to other causes, for example, in particular due to vibrations caused by a poor road condition or the like.

According to one exemplary embodiment, a map or map-based surroundings data 155 are used to ascertain where the triggering threshold-reducing function may be active or where the low triggering threshold value may be used or where the triggering threshold-reducing function may be deactivated or where the high triggering threshold value may be used. The recommendation not to use the triggering threshold-reducing function may be caused by high signal levels of impact signals 145, which originate from the road condition, or by an elevated misdetection rate, for example, for a special geometry of bridge pillars, etc.

Additionally or as an alternative to a direct evaluation of impact signals 145, a bumpy road may be inferred by an evaluation of pitch angles or headlight height level sensor systems as sensor-based surroundings data 165, for example. In the case of adaptive headlight systems, a pitch angle measurement may be used to infer a future segment of road based on a past segment of road. An evaluated period of time lies in the range from a few seconds, for example, 1 second, which may be utilized for method 300 and/or for control process 400.

If an exemplary embodiment includes an "and/or" linkage between a first feature and a second feature, then this is to be interpreted to mean that the exemplary embodiment according to one specific embodiment has both the first feature and the second feature and according to another specific embodiment has either only the first feature or only the second feature.

What is claimed is:

1. A method for controlling a triggering of at least one passenger protection device for a vehicle, the method comprising:
 determining whether a signal level of at least one read-in impact signal, which represents a change in a vehicle condition indicating a potential collision of the vehicle with a potential accident object, exceeds an evaluation limiting value;

setting a triggering threshold for controlling triggering of the at least one passenger protection device to a first triggering threshold value when the signal level of the at least one read-in impact signal exceeds the evaluation limiting value;

setting the triggering threshold to a second triggering threshold value when the signal level of the at least one read-in impact signal falls below the evaluation limiting value, the second triggering threshold value being lower than the first triggering threshold value; and using the triggering threshold to control triggering of the at least one passenger protection device.

2. The method as recited in claim 1, wherein in the determining step, determining whether the signal level of the at least one read-in impact signal exceeds the evaluation limiting value at least one of: i) before a minimum period prior to the potential collision has been reached, and ii) when the potential accident object is detected a maximum distance away from the vehicle.

3. The method as recited in claim 1, wherein in the using step, the second triggering threshold value is used within a time window, which includes an ascertained point in time of the potential collision of the vehicle with an accident object.

4. The method as recited in claim 1, wherein in using step, the first triggering threshold value is used when the signal level of the at least one read-in impact signal at least one of: i) exceeds the evaluation limiting value for a minimum period, and ii) exceeds the evaluation limiting value repeatedly within a minimum period.

5. The method as recited in claim 1, further comprising:
reading in surroundings data with regard to surroundings of the vehicle; and
setting the triggering threshold to either the first triggering threshold value or a triggering threshold value different from the first triggering threshold value depending on the read-in surroundings data.

6. The method as recited in claim 5, wherein in the reading in step, the surroundings data are read in by an interface to a device for providing map-based surroundings data, which represent a triggering threshold value recommended for at least one of: i) the surroundings of the vehicle, ii) a road condition characteristic of the surroundings of the vehicle, iii) a road surface characteristic of the surroundings of the vehicle, and iv) at least one additional road characteristic in the surroundings of the vehicle.

7. The method as recited in claim 5, wherein in the reading in step, the surroundings data are read in from an interface to at least one detection device for providing sensor-based surroundings data representing at least one of: i) a road condition, ii) a road surface, and iii) at least one additional road characteristic in the surroundings of the vehicle.

8. The method as recited in claim 5, wherein in the reading in step, the surroundings data are read in from an interface to at least one detection device for providing sensor-based surroundings data representing a potential accident object to ascertain the potential collision.

9. A device configured to carry out or activate a method for controlling a triggering of at least one passenger protection device for a vehicle, the method comprising:
determining whether a signal level of at least one read-in impact signal, which represents a change in a vehicle condition indicating a potential collision of the vehicle with a potential accident object, exceeds an evaluation limiting value;

setting a triggering threshold for controlling triggering of the at least one passenger protection device to a first triggering threshold value when the signal level of the at least one read-in impact signal exceeds the evaluation limiting value;

setting the triggering threshold to a second triggering threshold value when the signal level of the at least one read-in impact signal falls below the evaluation limiting value, the second triggering threshold value being lower than the first triggering threshold value; and using the triggering threshold to control triggering of the at least one passenger protection device.

10. A safety system for a vehicle, comprising:
at least one passenger protection device; and
a device to:
determine whether a signal level of at least one read-in impact signal, which represents a change in a vehicle condition indicating a potential collision of the vehicle with a potential accident object, exceeds an evaluation limiting value;

set a triggering threshold for controlling triggering of the at least one passenger protection device to a first triggering threshold value when the signal level of the at least one read-in impact signal exceeds the evaluation limiting value;

set the triggering threshold to a second triggering threshold value when the signal level of the at least one read-in impact signal falls below the evaluation limiting value, the second triggering threshold value being lower than the first triggering threshold value; and use the triggering threshold to control triggering of the at least one passenger protection device.

11. A non-transitory, machine-readable memory medium storing program instructions for controlling a triggering of at least one passenger protection device for a vehicle, the program instructions, when executed by a processor, causing the processor to perform:
determining whether a signal level of at least one read-in impact signal, which represents a change in a vehicle condition indicating a potential collision of the vehicle with a potential accident object, exceeds an evaluation limiting value;

setting a triggering threshold for controlling triggering of the at least one passenger protection device to a first triggering threshold value when the signal level of the at least one read-in impact signal exceeds the evaluation limiting value;

setting the triggering threshold to a second triggering threshold value when the signal level of the at least one read-in impact signal falls below the evaluation limiting value, the second triggering threshold value being lower than the first triggering threshold value; and using the triggering threshold to control triggering of the at least one passenger protection device.

* * * * *